A. P. Torrence,
Felling Trees,
Nº 29,019. Patented July 3, 1860.
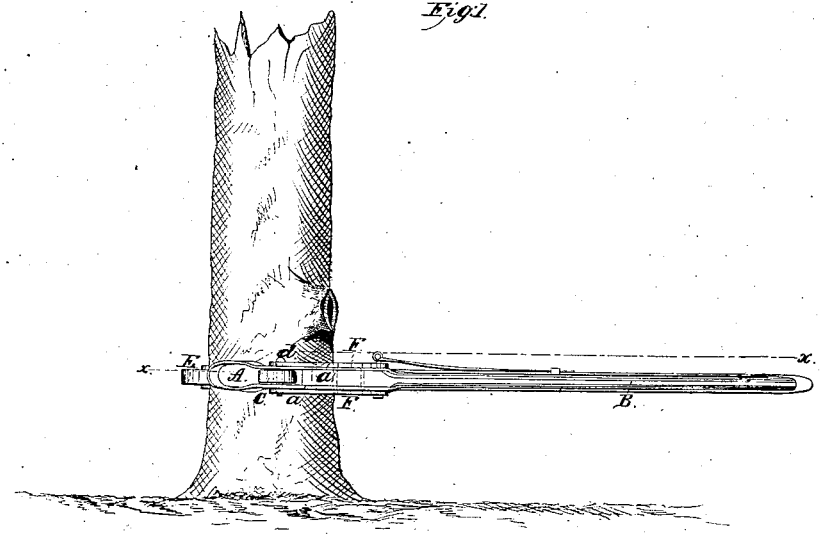
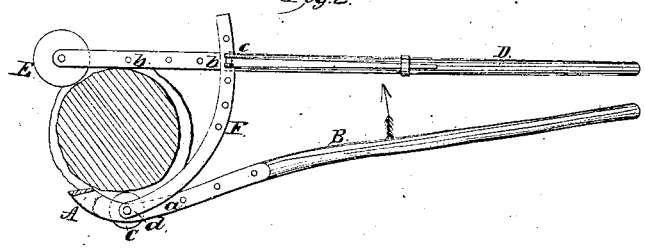

UNITED STATES PATENT OFFICE.

A. P. TORRENCE, OF OXFORD, GEORGIA.

MACHINE FOR FELLING TREES.

Specification of Letters Patent No. 29,019, dated July 3, 1860.

*To all whom it may concern:*

Be it known that I, A. P. TORRENCE, of Oxford, in the county of Newton and State of Georgia, have invented a new and Improved Device for Felling and Girdling Trees; and I do hereby declare that the following is a full, clear, and exact description of the same, reference being had to the annexed drawings, making a part of this specification, in which—

Figure 1 is a side view of my invention applied to its work. Fig. 2 is a plan sectional view of the same taken in the line $x, x$, Fig. 1.

Similar letters of reference indicate corresponding parts in the two figures.

This invention relates to an improvement on a tree-felling and girdling device for which Letters Patent were granted to me bearing date December 6th, 1859.

The object of the within described invention is to simplify the patented device above alluded to without in the least detracting from its efficiency.

To enable those skilled in the art to fully understand and construct my invention I will proceed to describe it.

A represents a gouge-shaped cutter which is attached to a lever B, and has a friction roller C, fitted within it, the roller being between the shanks $a, a$, of the gouge, and near the end of the lever B.

D is a lever which has a roller E, at its end and is perforated with holes $b$, through either of which a pin $c$, passes, said pin passing through curved bars F, F, and securing the same to the lever D. The bars F, F, are attached to the lever B, the axis $d$, of the roller C, passing through them, as shown plainly in Fig. 2.

The levers B, D, may be of any suitable length, and the animal is attached to the lever D, and the implement applied to the tree, as shown in Fig. 2. The operator grasps the lever B, and the implement is moved around the tree in the direction indicated by the arrow, the cutter A, gradually cuts into the tree, approaching the center at every revolution, and when the cutter nearly reaches the center and the tree begins to bind on the cutter, the implement is removed from the tree and the work finished with the ax or other tool.

In girdling trees the work may be done by hand exclusively, and the implement may be adjusted to suit trees of different diameters by regulating the point of attachment of the curved bars F, F, to the lever D.

The within described implement operates on the principle of the "cant hook," as the one formerly patented by me, and previously alluded to, but the present invention is simple and is in fact reduced to the simplest possible form. The latter being comprised of but few parts very cheaply constructed and not liable to get out of repair.

Having thus described my invention, what I claim as new, and desire to secure by Letters Patent, is—

The two levers B, D, provided respectively with the cutter A, and rollers C, E, and connected by the bars F, substantially as and for the purpose set forth.

A. P. TORRENCE.

Witnesses:
   A. W. EVANS,
   WM. D. LUCKIE.